(12) United States Patent
Cai

(10) Patent No.: US 9,219,405 B2
(45) Date of Patent: Dec. 22, 2015

(54) PORTABLE DRIVEN GENERATOR

(71) Applicant: Xiangjun Cai, Shenzhen (CN)

(72) Inventor: Xiangjun Cai, Shenzhen (CN)

(*) Notice: Subject to any disclaimer, the term of this patent is extended or adjusted under 35 U.S.C. 154(b) by 265 days.

(21) Appl. No.: 13/921,179

(22) Filed: Jun. 18, 2013

(65) Prior Publication Data

US 2013/0345024 A1  Dec. 26, 2013

Related U.S. Application Data

(60) Provisional application No. 61/662,333, filed on Jun. 20, 2012.

(51) Int. Cl.
| | |
|---|---|
| *A63B 71/00* | (2006.01) |
| *H02K 99/00* | (2014.01) |
| *A63B 22/06* | (2006.01) |
| *H02K 7/18* | (2006.01) |

(52) U.S. Cl.
CPC .......... *H02K 57/003* (2013.01); *A63B 22/0605* (2013.01); *H02K 7/1846* (2013.01)

(58) Field of Classification Search
IPC ..................... A63B 24/00; B62J 6/02
See application file for complete search history.

(56) References Cited

U.S. PATENT DOCUMENTS

| | | | | |
|---|---|---|---|---|
| 3,753,000 | A * | 8/1973 | Newman | 307/9.1 |
| 3,792,307 | A * | 2/1974 | Baker | 315/77 |
| 3,894,281 | A * | 7/1975 | Bloomfield | 322/1 |
| 4,225,848 | A * | 9/1980 | Roberts | 340/432 |
| 5,015,918 | A * | 5/1991 | Copeland | 315/76 |
| 7,204,623 | B2 * | 4/2007 | Uno | 362/473 |
| 2006/0208659 | A1 * | 9/2006 | Okishima | 315/205 |
| 2007/0252452 | A1 * | 11/2007 | Ishimoto et al. | 310/67 A |
| 2008/0100183 | A1 * | 5/2008 | Kitamura | 310/67 A |

* cited by examiner

*Primary Examiner* — Glenn Richman
(74) *Attorney, Agent, or Firm* — Raymond Y. Chan; David and Raymond Patent Firm

(57) ABSTRACT

A portable driven generator for a bicycle includes a power generator assembly and a power generating circuitry. The power generator assembly includes a power generator supported on a bicycle frame, a driven shaft rotatably extended from the power generator, and a frictional member attached on the driven shaft and is in physical contact with a tire of the bicycle, wherein when the wheel rotates, the frictional member and the driven shaft are driven to rotate accordingly for generating electricity by the power generator. The power generating circuitry electrically connected to the power generator and the electrical appliance, wherein when power generator is activated to generate electricity, the electricity is regulated by the power generating circuitry, which is arranged to control an output current of the electricity supplied to the electrical appliance so as to uniformly and constantly transmit electrical power to the electrical appliance for operation thereof.

26 Claims, 4 Drawing Sheets

PORTABLE DRIVEN GENERATOR

BACKGROUND OF THE PRESENT INVENTION

1. Field of Invention

The present invention relates to a power generator, and more particular to a portable driven generator which is capable of providing uniform and substantially constant electricity to an electrical appliance mounted on a bicycle frame.

2. Description of Related Arts

A conventional bicycle comprises a bicycle frame, a plurality of wheels rotatably mounted on the bicycle frame, a power generator mounted on the bicycle frame and communicated with the wheels, and an electrical appliance also mounted on the bicycle frame and is electrically connected to the power generator. When a user is riding on the bicycle, the wheels are driven to rotate, and the rotational movements of the wheels drive the power generator to generate a predetermined amount of electricity, which is then transmitted to the electrical appliance for operation thereof. Very often, the electrical appliance mentioned above is a LED light mounted at a rear portion of the bicycle frame so that when the user is riding the bicycle, electricity is generated to make the LED light illuminating.

There are several disadvantages related to the above-mentioned conventional bicycle. First, the electrical appliance, and the LED light in particular, acquires electricity from the power generator on a real-time basis. This implies that when the rider of the bicycle rides at varying speed, the rotational speed of the wheels cannot be kept substantially constant. Since the illumination generated by the electrical appliance depends on the power supplied, when less power is supplied, the intensity of the light is decreased. In other words, in a situation where the speed of the bicycle is not constant and fluctuates considerably, the intensity of the light generated by the electrical appliance fluctuates accordingly. This creates potential danger to the rider because when he or she is riding the bicycle at low speed, the intensity of the LED light may not be strong enough to alert other drivers on the road.

Second, for the conventional bicycle discussed above, the electrical appliance is built-in in the bicycle frame. The reason is that the power generator is specifically designed to supply electricity to that electrical appliance. The result is that the bicycle is not capable of accommodating other electrical appliances and the rider will not be able to connect his or her own electrical appliances to the bicycle.

Third, the power generator of the conventional bicycle is arranged to generate electricity when the wheels of the bicycle are rotating. The power generator usually comprises a driven shaft extended to contact with the wheels. Conventionally, there exist a lot of friction between the driven shaft and the wheels so that either the wheels or the driven shaft will be damaged very easily.

SUMMARY OF THE PRESENT INVENTION

The invention is advantageous in that it provides a portable driven generator for a bicycle which is capable of providing uniform and substantially constant electricity to an electrical appliance mounted on a bicycle frame.

Another advantage of the invention is to provide a portable driven generator for a bicycle, which is capable of constantly providing electricity to a plurality of electrical appliances. A particular feature of the present invention is that a rider of the bicycle may be able to connect his or her own electrical appliance and electrically connect it to the portable driven generator.

Another advantage of the invention is to provide a portable driven generator comprising a power generator assembly which utilizes the rotational movement of the wheels of the bicycle for generating electricity, yet the friction between the power generator assembly and the wheels are minimized for minimizing the chance of damage on the part of the wheels and the power generator assembly.

Another advantage of the invention is to provide a portable driven generator comprising a power generator assembly which does not involve complicated mechanical or electrical components so that the manufacturing cost of the present invention can be minimized.

Another advantage of the invention is to provide a portable driven generator comprising a power generator assembly which can be detachably attached on the bicycle frame so that the portable driven generator can be used in a wide variety of different bicycles.

Additional advantages and features of the invention will become apparent from the description which follows, and may be realized by means of the instrumentalities and combinations particular point out in the appended claims.

According to the present invention, the foregoing and other objects and advantages are attained by providing a portable driven generator for a bicycle having bicycle frame, a wheel rotatably supported on the bicycle frame, a tire supported on the wheel, and an electrical appliance mounted on the bicycle frame, wherein the portable driven generator comprises:

a power generator assembly which comprises a power generator supported on the bicycle frame, a driven shaft rotatably extended from the power generator, and a frictional member attached on the driven shaft and is in physical contact with the tire of the bicycle, wherein when the wheel rotates, the frictional member and the driven shaft are driven to rotate accordingly for generating electricity by the power generator; and a power generating circuitry electrically connected to the power generator and the electrical appliance, wherein when power generator is activated to generate electricity, the electricity is regulated by the power generating circuitry, which is arranged to control an output current of the electricity supplied to the electrical appliance so as to uniformly and constantly transmit electrical power to the electrical appliance for operation thereof.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
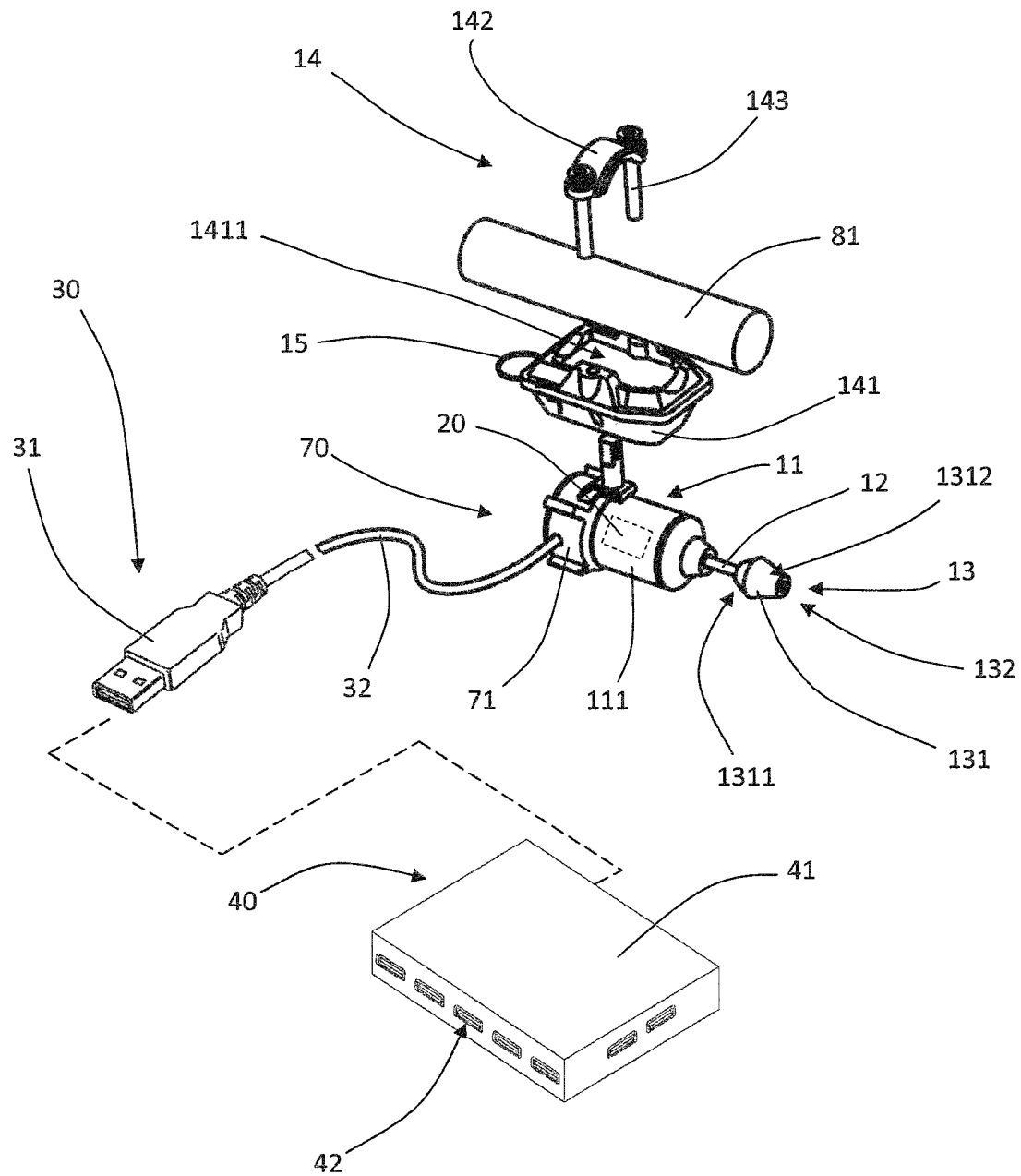
FIG. 1 is a perspective view of a portable driven generator according to a preferred embodiment of the present invention.

Referring to FIG. 1 to FIG. 4 of the drawings, a portable driven generator according to a preferred embodiment of the present invention is illustrated. The portable driven generator is for a bicycle 80 having bicycle frame 81, a wheel 82 rotatably supported on the bicycle frame 81, a tire 83 supported on the wheel 82, and an electrical appliance 70 mounted on the bicycle frame 81. According to the preferred embodiment, the portable driven generator comprises a power generator assembly 10 and a power generating circuitry 20.

The power generator assembly 10 comprises a power generator 11 supported on the bicycle frame 81, a driven shaft 12 rotatably extended from the power generator 11, and a frictional member 13 attached on the driven shaft 12 and is in physical contact with the tire 83 of the bicycle 80, wherein when the wheel rotates 82, the frictional member 13 and the driven shaft 12 are also driven to rotate accordingly for generating electricity by the power generator 11.

The power generating circuitry 20 is electrically connected to the power generator 11 and the electrical appliance 70, wherein when power generator 11 is activated to generate electricity, the electricity is regulated by the power generating circuitry 20, which is arranged to control an output current of the electricity supplied to the electrical appliance 70 so as to uniformly and constantly transmit electrical power to the electrical appliance 70 for operation thereof.

According to the preferred embodiment of the present invention, the power generator assembly 10 further comprises a mounting arrangement 14 attached between the power generator 11 and the bicycle frame 81 so as to mount the power generator 11 on the bicycle frame 81. In this preferred embodiment, the mounting arrangement 14 is detachably mounted onto the bicycle frame 81 so that the power generator 11, which is connected to the mounting arrangement 14, is also capable of detachably attaching on the bicycle frame 81.

The mounting arrangement 14 comprises a supporting housing 141 connected between the power generator 11 and the bicycle frame 81, wherein the power generating circuitry 20 is securely received in the supporting housing 141 and is electrically connected to the power generator 11. The mounting arrangement 14 further comprises a holder 142 detachably mounted on a top side of the supporting housing 141, while the supporting housing 141 has a holding platform 1411 formed on a top side thereof, wherein a frame member 811 of the bicycle frame 81, such as an elongated metallic bar, is arranged to accommodate on the holding platform 1411 and is retained in position by the holder 142. Furthermore, the power generator 11 is mounted at a bottom side of the supporting housing 141 so that the supporting housing 141 is connected between the power generator 11 and the bicycle frame 81.

Figure 2:
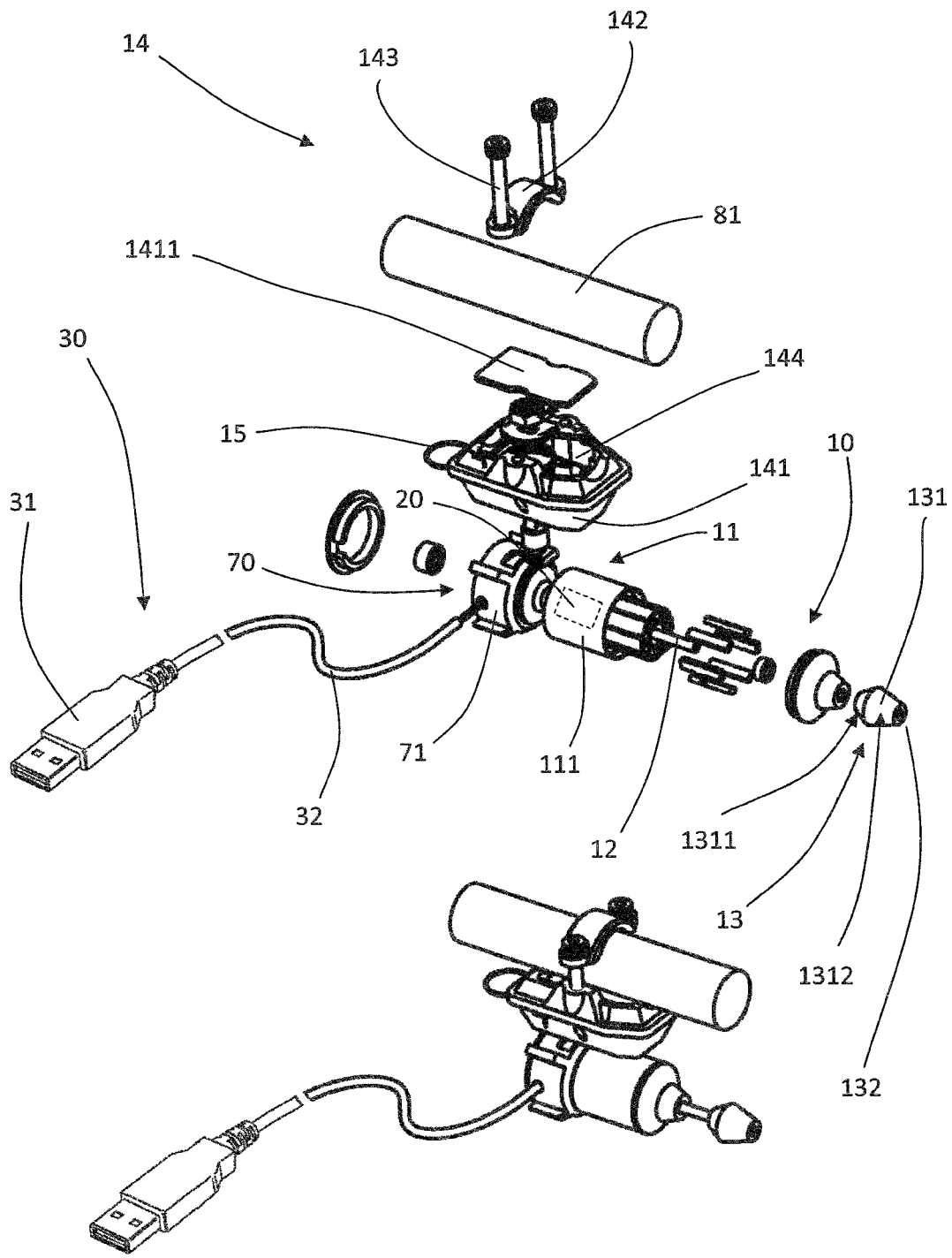
FIG. 2 is an exploded perspective view of the portable driven generator according to the above preferred embodiment of the present invention.

As shown in FIG. 1 and FIG. 2 of the drawings, the holder 142 is detachably mounted on the supporting housing 141 at a position substantially aligning with the holding platform 1411 through a plurality of connectors 143. Thus, it can be seen that a user is able to easily connect the portable driven generator to the bicycle frame 81 of the bicycle 80 by securely sandwiching the elongated metallic bar of the bicycle frame 81 between the holder 142 and the supporting housing 141.

The mounting arrangement 14 further comprises a resilient element 144 provided in the supporting housing 141 for absorbing the vibration generated by the bicycle frame 81 when the bicycle is operating. Since excessive vibration may damage the power generator 11, the resilient element 144 is arranged to absorb the vibration caused when the bicycle 80 is being ridden by the user. This element is extremely important when the bicycle 80 is being ridden on a bumpy road.

The power generator 11 comprises a generator unit 111 mounted underneath the supporting housing 141 wherein the driven shaft 12 is rotatably and outwardly extended from the generator unit 111, in such a manner that when the driven shaft 12 is driven to rotate, the generator unit 111 is arranged to generate a predetermined amount of electricity which is transmitted to the power generating circuitry 20.

The electrical appliance 70 comprises an illumination unit 71 mounted on the power generator 11, wherein the electricity generated by the power generator 11 is transmitted to the illumination unit 71 for activating it to generate illumination. It is worth mentioning that the illumination unit 71 can be built-in as part of the portable driven generator. Alternatively, the electrical appliance 70 can be considered as an add-on to the bicycle 80 and it is detachably connect to the portable driven generator.

Figure 3:
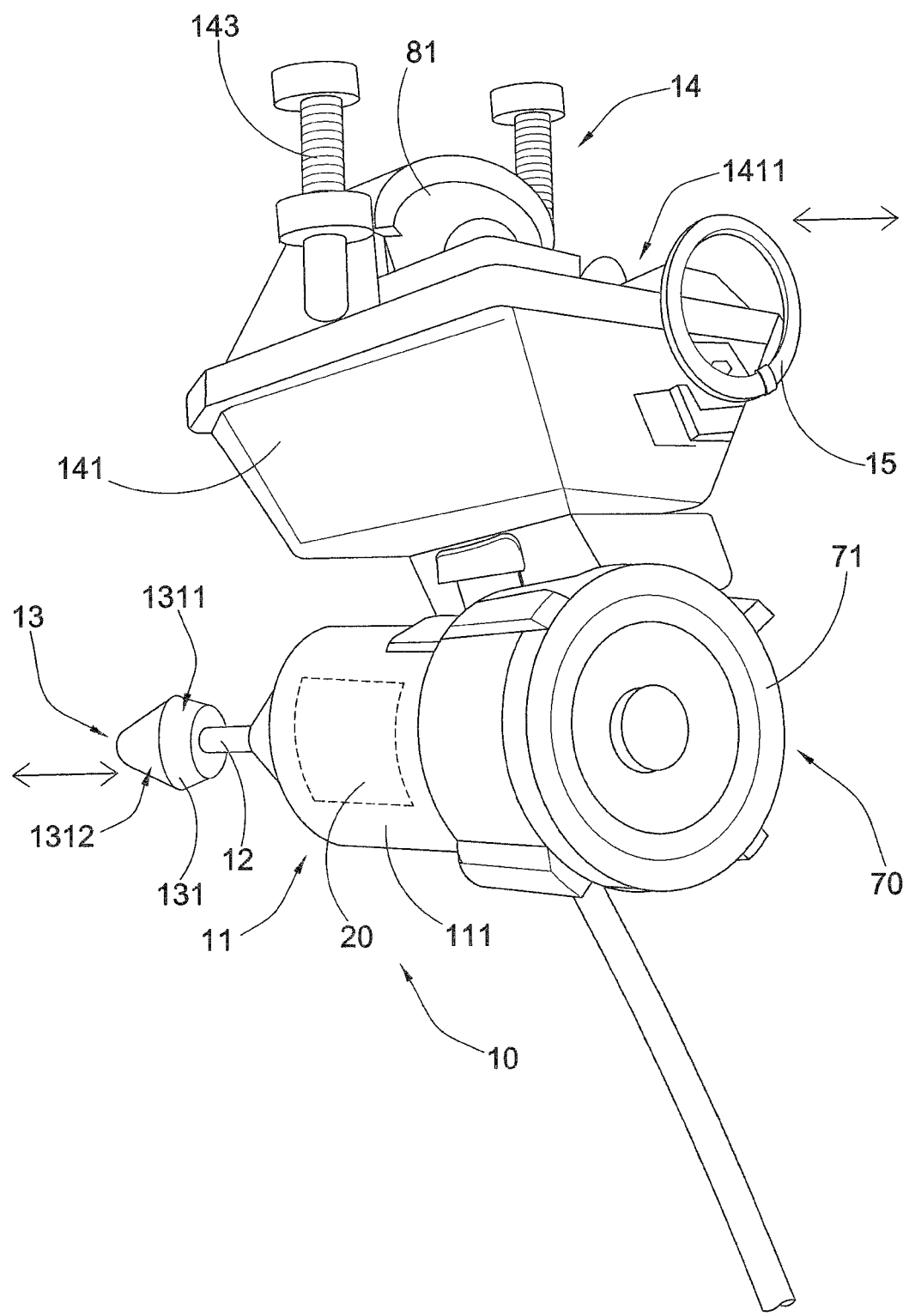
FIG. 3 is another perspective view of the portable driven generator according to the above preferred embodiment of the present invention.
Figure 4:
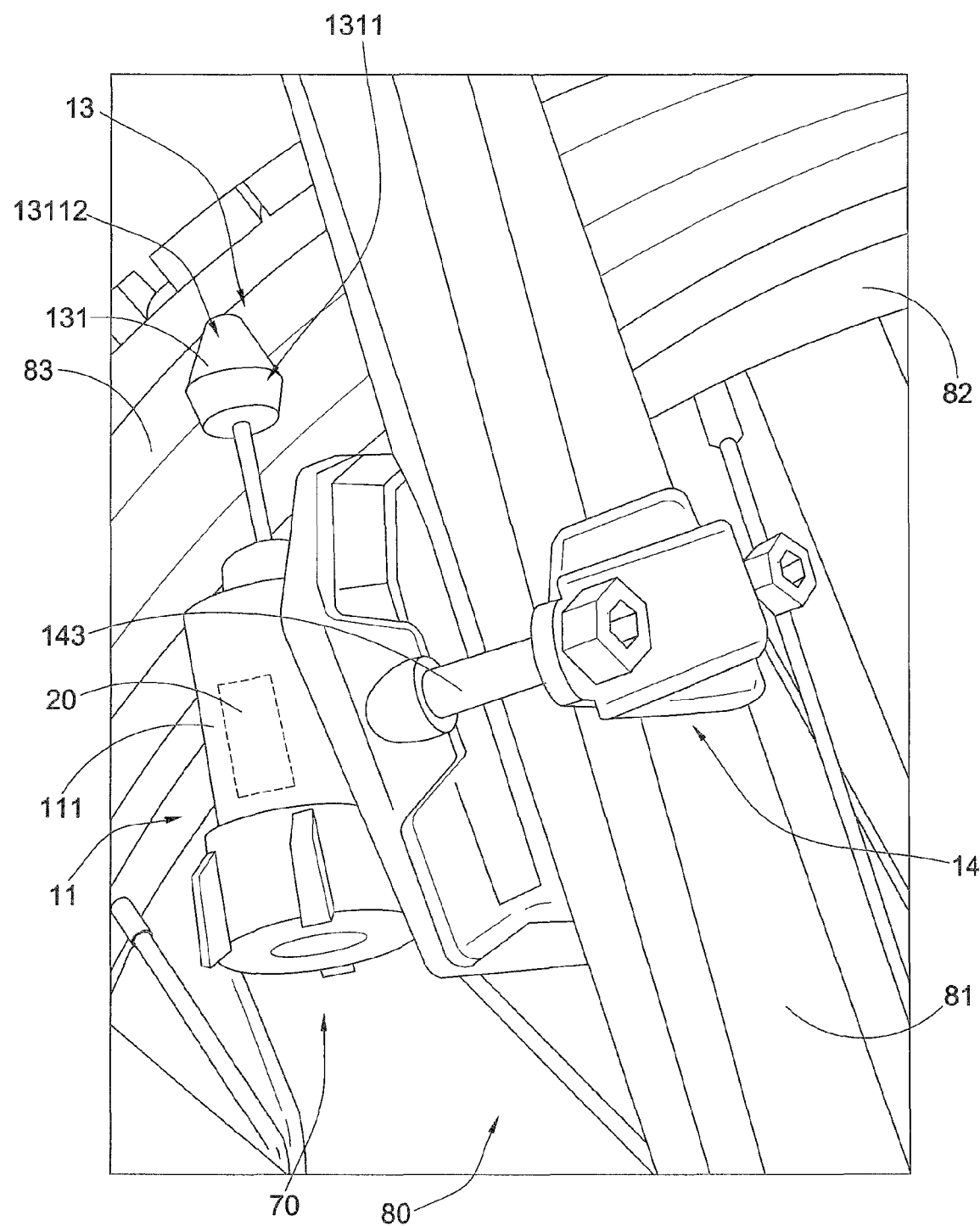
FIG. 4 is a schematic diagram of the portable driven generator according to the above preferred embodiment of the present invention, illustrating that the portable driven generator is mounted on a bicycle frame.

In this preferred embodiment, the illumination unit 71 of the electrical appliance 70 is built-in on the portable driven generator and is mounted on the power generator 11 as shown in FIG. 1 to FIG. 3 of the drawings. Furthermore, the portable driven generator further comprises a power outlet port 30 adapted for electrically connecting to an external and additional electrical appliance 70, such as a cellular phone. The power outlet port 30 comprises a connection head 31 extended from the power generator 11 through a connection cable 32 and is electrically connected to the power generating circuitry 20 which is arranged to control and regulate the power outputted to the external electrical appliance 70 so as to prevent the electrical appliance 70 from being damaged by excessive current or voltage.

It is worth mentioning that the connection head 31 is preferably embodied as a USB port adapted for connecting to a USB inlet of the electrical appliance 70. Alternatively, the connection head 31 can be embodied as a wide variety of connecting ports which are used to electrically connect to the electrical appliance 70.

The frictional member 13 comprises a main body 131 having a through slot 132 formed thereon, wherein the driven shaft 12 of the power generator assembly 10 is arranged to penetrate the through slot 132 so as to allow the frictional member 13 to mount on the driven shaft 12. Note that the main body 131 is made of material having a high coefficient of friction, such as rubber, so as to maximize an efficiency of the power generator 11.

The power generator 11 is mounted on the bicycle frame 81 such that the frictional member 13 is in physical contact with the tire 83 of the bicycle 80. Since the tire 83 is usually made by rubber material, when the frictional member 13 is in physical contact with the tire 83, the rotational movement of the wheel 82 can be efficiently transmitted to the frictional member 13.

According to the preferred embodiment of the present invention, the main body 131 of the frictional member 13 has a connecting portion 1311 and a frictional portion 1312 extended from the connecting portion 1311, wherein the frictional portion 1312 and the connecting portion 1311 is inclined at a predetermined angle so as to allow the frictional portion 1312 to fittedly align with the tire 83 of the bicycle 80 while the connecting portion 1311 is securely connected to the driven shaft 12 of the power generator assembly 10. In other words, the frictional member 13 is mounted on the bicycle frame 81 such that a maximum amount of rotational movement of the wheel 82 can be transmitted to the power generator 11 and thus converted into electricity energy.

The power generator assembly 10 further comprises a control switch 15 operated provided on the power generator 11, wherein when the control switch 15 is activated, the power generator 11 is activated to generate electricity in response to rotational movement of the corresponding wheel 82. Furthermore, the driven draft 12 of the power generator assembly 10 is arranged to longitudinally move in such a manner that when the driven shaft 12 is outwardly pulled from the power generator 11, the power generator 11 is deactivated.

The power driven generator further comprises a connection hub 40 mounted on the bicycle frame 81 and is electrically connected to the power outlet port 30, wherein the connection hub 40 comprises a hub housing 41 and a plurality of power outlets 42 formed thereon, wherein a user is able to electrically connect the external electrical appliance 70 to one of the power outlets 42 so as to acquire electricity generated by the power generator 11.

According to the preferred embodiment of the present invention, the power generating circuitry 20 of the present invention controls the output of the power generator assembly 10 to have a maximum output voltage of 5.25V and a direct current output of 800 mA. This ensures that the electrical appliance 70 connected to the power generator assembly 10 will not be damaged by excessive current or voltage.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A portable driven generator for a bicycle having bicycle frame, a wheel rotatably supported on said bicycle frame, a tire supported on said wheel, and an electrical appliance mounted on said bicycle frame, wherein said portable driven generator comprises:
    a power generator assembly which comprises:
    a power generator supported on said bicycle frame,
    a driven shaft rotatably extended from said power generator,
    a frictional member attached on said driven shaft and is in physical contact with said tire of said bicycle, wherein when said wheel rotates, said frictional member and said driven shaft are driven to rotate accordingly for generating electricity by said power generator, and
    a mounting arrangement, attached between said power generator and said bicycle frame so as to mount said power generator on said bicycle frame, comprising a supporting housing connected between said power generator and said bicycle frame; and
    a power generating circuitry electrically connected to said power generator and said electrical appliance, wherein when power generator is activated to generate electricity, said electricity is regulated by said power generating circuitry, which is arranged to control an output current of said electricity supplied to said electrical appliance so as to uniformly and constantly transmit electrical power to said electrical appliance for operation thereof, wherein said power generating circuitry is securely received in said supporting housing and is electrically connected to said power generator, wherein said mounting arrangement further comprises a holder detachably mounted on a top side of said supporting housing, while said supporting housing has a holding platform formed on said top side thereof, wherein said bicycle frame is arranged to accommodate on said holding platform and is retained in position by said holder, wherein said power generator is mounted at a bottom side of said supporting housing so that said supporting housing is connected between said power generator and said bicycle frame.

2. The portable driven generator, as recited in claim 1, wherein said holder is detachably mounted on said supporting housing at a position substantially aligning with said holding platform through a plurality of connectors.

3. The portable driven generator, as recited in claim 2, wherein said mounting arrangement further comprises a resilient element provided in said supporting housing for absorbing said vibration generated by said bicycle frame when said bicycle is operated.

4. The portable driven generator, as recited in claim 2, wherein said power generator comprises a generator unit mounted underneath said supporting housing wherein said driven shaft is rotatably and outwardly extended from said generator unit, in such a manner that when said driven shaft is driven to rotate, said generator unit is arranged to generate a predetermined amount of electricity which is transmitted to said power generating circuitry.

5. The portable driven generator, as recited in claim 4, further comprising a power outlet port adapted for electrically connecting to an external and additional electrical appliance, wherein said power outlet port comprises a connection head extended from said power generator and a connection cable connecting said connection head and said power generator, wherein said power outlet port is electrically connected to said power generating circuitry which is arranged to control and regulate said power outputted to said external electrical appliance.

6. The portable driven generator, as recited in claim 5, wherein said frictional member comprises a main body having a through slot formed thereon, wherein said driven shaft of said power generator assembly is arranged to penetrate said through slot so as to allow said frictional member to mount on said driven shaft.

7. The portable driven generator, as recited in claim 6, wherein said main body of said frictional member has a connecting portion and a frictional portion extended from said connecting portion, wherein said frictional portion and said connecting portion is inclined at a predetermined angle so as to allow said frictional portion to fittedly align with said tire of said bicycle while said connecting portion is securely connected to said driven shaft of said power generator assembly.

8. The portable driven generator, as recited in claim 7, wherein said power generator assembly further comprises a control switch operatively provided on said power generator, wherein when said control switch is activated, said power generator is activated to generate electricity in response to rotational movement of said corresponding wheel, wherein said driven draft of said power generator assembly is arranged to longitudinally move in such a manner that when said driven shaft is outwardly pulled from said power generator, said power generator is deactivated.

9. The portable driven generator, as recited in claim 4, further comprising a connection hub mounted on said bicycle frame and is electrically connected to said power outlet port, wherein said connection hub comprises a hub housing and a plurality of power outlets formed thereon, wherein a user is able to electrically connect said external electrical appliance to one of said power outlets so as to acquire electricity generated by said power generator.

10. The portable driven generator, as recited in claim 9, wherein said frictional member comprises a main body having a through slot formed thereon, wherein said driven shaft of said power generator assembly is arranged to penetrate said through slot so as to allow said frictional member to mount on said driven shaft.

11. The portable driven generator, as recited in claim 10, wherein said main body of said frictional member has a connecting portion and a frictional portion extended from said connecting portion, wherein said frictional portion and said connecting portion is inclined at a predetermined angle so as to allow said frictional portion to fittedly align with said tire of said bicycle while said connecting portion is securely connected to said driven shaft of said power generator assembly.

12. The portable driven generator, as recited in claim 11, wherein said power generator assembly further comprises a control switch operatively provided on said power generator, wherein when said control switch is activated, said power generator is activated to generate electricity in response to rotational movement of said corresponding wheel, wherein said driven draft of said power generator assembly is arranged to longitudinally move in such a manner that when said driven shaft is outwardly pulled from said power generator, said power generator is deactivated.

13. A bicycle, comprising:
a bicycle frame;
at least one wheel rotatably supported on said bicycle frame;
at least one tire supported on said wheel, and an electrical appliance mounted on said bicycle frame; and
a portable driven generator, which comprises a power generator assembly which comprises:
 a power generator supported on said bicycle frame,
 a driven shaft rotatably extended from said power generator,
 a frictional member attached on said driven shaft and is in physical contact with said tire of said bicycle, wherein when said wheel rotates, said frictional member and said driven shaft are driven to rotate accordingly for generating electricity by said power generator, and
 a mounting arrangement attached between said power generator and said bicycle frame so as to mount said power generator on said bicycle frame; and
a power generating circuitry electrically connected to said power generator and said electrical appliance, wherein when power generator is activated to generate electricity, said electricity is regulated by said power generating circuitry, which is arranged to control an output current of said electricity supplied to said electrical appliance so as to uniformly and constantly transmit electrical power to said electrical appliance for operation thereof, wherein said mounting arrangement comprises a supporting housing connected between said power generator and said bicycle frame, wherein said power generating circuitry is securely received in said supporting housing and is electrically connected to said power generator.

14. The bicycle, as recited in claim 13, wherein said mounting arrangement further comprises a holder detachably mounted on a top side of said supporting housing, while said supporting housing has a holding platform formed on said top side thereof, wherein said bicycle frame is arranged to accommodate on said holding platform and is retained in position by said holder, wherein said power generator is mounted at a bottom side of said supporting housing so that said supporting housing is connected between said power generator and said bicycle frame.

15. The bicycle, as recited in claim 14, wherein said holder is detachably mounted on said supporting housing at a position substantially aligning with said holding platform through a plurality of connectors.

16. The bicycle, as recited in claim 15, wherein said mounting arrangement further comprises a resilient element provided in said supporting housing for absorbing said vibration generated by said bicycle frame when said bicycle is operated.

17. The bicycle, as recited in claim 16, wherein said power generator comprises a generator unit mounted underneath said supporting housing wherein said driven shaft is rotatably and outwardly extended from said generator unit, in such a manner that when said driven shaft is driven to rotate, said generator unit is arranged to generate a predetermined amount of electricity which is transmitted to said power generating circuitry.

18. The bicycle, as recited in claim 17, wherein said electrical appliance comprises an illumination unit mounted on said power generator, wherein said electricity generated by said power generator is transmitted to said illumination unit for activating it to generate illumination.

19. The bicycle, as recited in claim 18, further comprising a power outlet port adapted for electrically connecting to an external and additional electrical appliance, wherein said power outlet port comprises a connection head extended from said power generator and a connection cable connecting said connection head and said power generator, wherein said power outlet port is electrically connected to said power generating circuitry which is arranged to control and regulate said power outputted to said external electrical appliance.

20. The bicycle, as recited in claim 19, wherein said frictional member comprises a main body having a through slot formed thereon, wherein said driven shaft of said power generator assembly is arranged to penetrate said through slot so as to allow said frictional member to mount on said driven shaft.

21. The bicycle, as recited in claim 20, wherein said main body of said frictional member has a connecting portion and a frictional portion extended from said connecting portion, wherein said frictional portion and said connecting portion is inclined at a predetermined angle so as to allow said frictional portion to fittedly align with said tire of said bicycle while said connecting portion is securely connected to said driven shaft of said power generator assembly.

22. The bicycle, as recited in claim 21, wherein said power generator assembly further comprises a control switch operatively provided on said power generator, wherein when said control switch is activated, said power generator is activated to generate electricity in response to rotational movement of said corresponding wheel, wherein said driven draft of said power generator assembly is arranged to longitudinally move in such a manner that when said driven shaft is outwardly pulled from said power generator, said power generator is deactivated.

23. The bicycle, as recited in claim 18, further comprising a connection hub mounted on said bicycle frame and is electrically connected to said power outlet port, wherein said connection hub comprises a hub housing and a plurality of power outlets formed thereon, wherein a user is able to electrically connect said external electrical appliance to one of said power outlets so as to acquire electricity generated by said power generator.

24. The bicycle, as recited in claim 23, wherein said frictional member comprises a main body having a through slot formed thereon, wherein said driven shaft of said power generator assembly is arranged to penetrate said through slot so as to allow said frictional member to mount on said driven shaft.

25. The bicycle, as recited in claim 24, wherein said main body of said frictional member has a connecting portion and a frictional portion extended from said connecting portion, wherein said frictional portion and said connecting portion is inclined at a predetermined angle so as to allow said frictional portion to fittedly align with said tire of said bicycle while said connecting portion is securely connected to said driven shaft of said power generator assembly.

26. The bicycle, as recited in claim 25, wherein said power generator assembly further comprises a control switch operatively provided on said power generator, wherein when said control switch is activated, said power generator is activated to generate electricity in response to rotational movement of said corresponding wheel, wherein said driven draft of said power generator assembly is arranged to longitudinally move in such a manner that when said driven shaft is outwardly pulled from said power generator, said power generator is deactivated.

* * * * *